(12) United States Patent
Schreiber

(10) Patent No.: US 10,830,328 B2
(45) Date of Patent: Nov. 10, 2020

(54) COAXIAL GEAR MECHANISM WITH POSITIVE TRANSMISSION RATIO

(71) Applicant: WITTENSTEIN SE, Igersheim (DE)

(72) Inventor: Heiko Schreiber, Doberschau (DE)

(73) Assignee: WITTENSTEIN SE, Igersheim (DE)

( * ) Notice: Subject to any disclaimer, the term of this patent is extended or adjusted under 35 U.S.C. 154(b) by 352 days.

(21) Appl. No.: 15/880,814

(22) Filed: Jan. 26, 2018

(65) Prior Publication Data
US 2018/0209530 A1 Jul. 26, 2018

(30) Foreign Application Priority Data

Jan. 26, 2017 (DE) .......................... 10 2017 101 565

(51) Int. Cl.
*F16H 49/00* (2006.01)
*F16H 25/06* (2006.01)

(52) U.S. Cl.
CPC .......... *F16H 49/001* (2013.01); *F16H 25/06* (2013.01)

(58) Field of Classification Search
CPC ............................... F16H 25/06; F16H 49/001
See application file for complete search history.

(56) References Cited

U.S. PATENT DOCUMENTS

| 3,258,994 A * | 7/1966 | Gorfin | F16H 49/001 475/163 |
| 3,468,175 A | 9/1969 | Rabek | |
| 5,662,008 A * | 9/1997 | Aubin | F16H 49/001 74/640 |
| 8,783,134 B2 | 7/2014 | Michel et al. | |
| 9,470,301 B2 * | 10/2016 | Kuo | F16H 49/001 |
| 10,267,404 B2 * | 4/2019 | Schreiber | F16H 49/001 |
| 2013/0255421 A1 * | 10/2013 | Schmidt | F16H 55/08 74/434 |
| 2016/0298747 A1 * | 10/2016 | Schreiber | F16H 49/001 |
| 2016/0298750 A1 * | 10/2016 | Schreiber | F16H 49/001 |

FOREIGN PATENT DOCUMENTS

| DE | 102007011175 A1 | 9/2008 |
| DE | 102007016189 A1 | 10/2008 |
| DE | 102010016581 A1 | 10/2011 |

(Continued)

OTHER PUBLICATIONS

German search report for patent application No. 10 2017 101 565.5 dated Oct. 12, 2017.

(Continued)

*Primary Examiner* — Terence Boes

(57) ABSTRACT

Gear mechanism (1), in particular coaxial gear mechanism, having an internal gear (3) with an inwardly directed toothing (5), a tooth carrier (11) which is arranged coaxially with respect to the internal gear and in which a multiplicity of teeth (7) for engaging with the toothing (5) are accommodated, wherein the teeth (7) are mounted radially displaceably in the tooth carrier (11), a drive element with a profiling (22) for radially driving the radially displaceably mounted teeth (7), wherein the profiling (22) has, over its circumference, at least two elevations, wherein the gear mechanism is constructed such that there is a positive transmission ratio between a drive via the drive element and an output via the tooth carrier (11).

10 Claims, 2 Drawing Sheets

(56) References Cited

FOREIGN PATENT DOCUMENTS

| | | | |
|---|---|---|---|
| DE | 02015105524 A1 | 10/2016 | |
| DE | 102015105525 A1 | 10/2016 | |
| DE | 102016101381 A1 | 1/2017 | |
| EP | 3135954 A1 | 3/2017 | |
| EP | 3168496 A1 * | 5/2017 | ........... F16H 49/001 |
| EP | 3168497 A1 * | 5/2017 | ........... F16H 49/001 |
| GB | 153982 A | 11/1920 | |
| GB | 400282 A | 10/1933 | |
| WO | 2011160314 A1 | 12/2011 | |

OTHER PUBLICATIONS

European search report for patent application No. 18153511.3 dated May 28, 2018.

* cited by examiner

COAXIAL GEAR MECHANISM WITH POSITIVE TRANSMISSION RATIO

FIELD OF THE INVENTION

The invention relates to a gear mechanism and to a method for producing a gear mechanism.

PRIOR ART

From the prior art, gear mechanisms are known which comprise teeth which are mounted radially displaceably in a tooth carrier. For driving the teeth, drive elements with a profiling, such as for example cam disks, are used. The teeth engage into internal teeth of a toothing, such that a relative movement occurs between the tooth carrier with the teeth and the toothing. The relative movement between toothing and teeth is in this case smaller, by at least an order of magnitude, than the movement of the drive element with the profiling. In this way, it is possible to achieve high transmission ratios; an example of such a gear mechanism is published in DE 10 2007 011 175 A1.

A critical point of this gear mechanism is the mounting of the teeth on the cam disk and the forces acting on the bearing surfaces in the tooth carrier. A reduction of the forces with an unchanged torque, or an increase of the torque transmitted by the gear mechanism with unchanged forces, is desirable for example in order to increase the service life of the gear mechanism or the maximum transmissible torques. Furthermore, lower forces with an unchanged torque lead, under some circumstances, to reduced friction, and can thus increase the efficiency of the gear mechanism.

DISCLOSURE OF THE INVENTION

It is an object of the invention to specify gear mechanisms which are improved in relation to gear mechanisms known from the prior art, wherein it is sought to achieve reduced friction and thus less heat generation, or an increased maximum admissible torque or a reduction of internal forces. It is furthermore an object of the invention to specify a method for producing a gear mechanism of said type.

The object is achieved by means of a gear mechanism and by means of a method for producing a gear mechanism as discussed herein. Advantageous refinements and embodiments emerge from the subclaims and from this description.

One aspect of the invention relates to a gear mechanism, in particular a coaxial gear mechanism, having an internal gear with an inwardly directed toothing, a tooth carrier which is arranged coaxially with respect to the internal gear and in which a multiplicity of teeth for engaging with the toothing are accommodated, wherein the teeth are mounted radially displaceably in the tooth carrier, a drive element with a profiling for radially driving the radially displaceably mounted teeth, wherein the profiling has, over its circumference, at least two elevations, wherein the gear mechanism is constructed such that there is a positive transmission ratio between a drive via the drive element and an output via the tooth carrier.

A further aspect of the invention relates to a method for producing a gear mechanism in one of the typical embodiments described herein.

Embodiments of the invention relate in particular to coaxial gear mechanisms. The axial direction typically refers to the longitudinal axis of the gear mechanism. An engagement of the teeth into the toothing of the internal gear typically refers to the engagement of the teeth into the internal teeth of the toothing, which in typical embodiments is circular.

In typical embodiments, the drive element comprises a cam disk or is formed by a cam disk. The expression "cam disk" is typically to be understood generally to mean that the corresponding component does not imperatively need to resemble a disk. Rather, the cam disk may also be part of a drive shaft, or may have an elongated shape, in particular with multiple sections. One or more such sections may have a varying radius, such that the function of a cam disk is performed. Further sections may have other functions, and may for example be cylindrical or else equipped with edges, for example for torque transmission. Typically, the expression "cam disk" relates primarily to the function of said component, specifically to the provision of an encircling profiling in order, for example in a manner dependent on the angular position of the drive shaft and thus of the cam disk, to drive the teeth in a radial direction or allow the teeth to slide back in the guides.

The toothing is typically an encircling toothing. The teeth or tooth tips of the teeth engage into internal teeth of the toothing, wherein the teeth are typically mounted so as to be linearly radially displaceable relative to the tooth carrier. Here, "linearly radially" normally means that a guide in a radial direction is provided, which guide permits a movement of the tooth only in a radial direction. Typically, by means of the guide, a tooth can be linearly displaced in exactly one direction; this may be achieved for example by virtue of the tooth having, over a particular length extent, a constant cross section in a displacement direction, wherein the tooth carrier likewise has an opening for the tooth with constant cross section. Normally, the teeth are mounted in the tooth carrier so as to be displaceable in each case in exactly one direction, typically in the direction of the longitudinal axis of the tooth. Furthermore, in typical embodiments, the rotational degree of freedom of the teeth relative to the tooth carrier about the longitudinal axis of the gear mechanism is blocked. This may be realized for example by means of a linear guide of the teeth in a radial direction in the tooth carrier. In this way, the teeth rotate with the tooth carrier about the longitudinal axis of the gear mechanism but not relative to the tooth carrier.

In typical embodiments of the gear mechanism according to the invention, at least a part of the teeth is of flexurally rigid design. Here, the expression "flexurally rigid" is typically to be understood technically to mean that, owing to the stiffness of the material of the teeth, bending movements of the teeth are so small that they are at least substantially insignificant for the kinematics of the gear mechanism. Flexurally rigid teeth encompass in particular teeth which are produced from a metal alloy, in particular steel or a titanium alloy, a nickel alloy or other alloys. Furthermore, it is also possible for flexurally rigid teeth composed of plastic to be provided, in particular in the case of gear mechanisms in which at least one of the following parts is also likewise produced from plastic: toothing on an internal gear or a gearwheel, tooth carrier and drive element. In typical embodiments of the invention, the tooth carrier and the teeth are produced from a metal alloy, or additionally the toothing or further additionally the drive element are produced from a metal alloy. Such gear mechanisms offer the advantage that they are highly torsionally stiff and can accommodate high loads. Gear mechanisms which are composed at least partially of plastic, or which comprise components composed of plastic, offer the advantage that they can have a low weight. The expression "flexurally rigid" is to be understood in particular to mean a flexural stiffness about a longitudinal axis of the teeth.

In typical embodiments, between the tooth and the cam disk, there is arranged a pivot segment which is mounted on a rolling bearing arrangement, which in turn lies on the cam disk. Advantageous embodiments include a pivot segment which is arranged between the cam disk and in each case at least one tooth. The pivot segment allows the tooth to tilt relative to the surface of the cam disk or relative to the pivot segment. Typically, at least two teeth are mounted on a pivot segment. In further embodiments, exactly one tooth, for example a round tooth or a flat tooth, is mounted on in each case one of the pivot segments. Flat teeth can be secured against rotation about their own axis in the bearing arrangement. Multiple teeth mounted on a pivot segment are typically arranged adjacent to one another in a row in an axial direction. With such arrangements of multiple teeth or with flat teeth, the running smoothness of the pivot segments can be increased.

Typical embodiments of the invention comprise a cam disk as drive element. The cam disk preferably has a non-circular or non-elliptical arcuate shape or curve. The non-circular or non-elliptical arcuate shape offers the advantage that different cams can be used, for example in order to set different transmission ratios. In the context of this application, eccentrics typically fall under circular or elliptical shapes, because, in the case of eccentrics, it is merely the case that the axis of rotation does not correspond to the central axis of the circular shape, although a circular shape is nevertheless present. Typical cam disks comprise at least or exactly two elevations, which are typically arranged so as to be uniformly distributed over the circumference. The elevations may also be referred to as maxima. Multiple elevations bring more teeth into engagement with the toothing.

In typical embodiments, the tooth carrier or the toothing are of circular form. This offers the advantage of a simple geometry for the tooth carrier and the toothing. The transmission of force typically occurs on the slow side of the gear mechanism, between the toothing and the tooth carrier. This offers the advantage that the path for the force transmission is extremely short, such that an extremely high stiffness can be achieved.

The internal teeth of the toothing and the teeth typically have curved flanks. In typical embodiments, internal teeth and teeth each have tooth tips which, in cross section, correspond to a truncated pyramid or a pyramid in each case with curved flanks. For one possible embodiment of a curvature in the form of a logarithmic spiral, reference is made to DE 10 2007 011 175 A1. The curved surface offers the advantage that the flanks that are in engagement make areal and not merely linear or punctiform contact. In this way, a good load distribution between a large number of teeth, and extremely high stiffness in the transmission of force between the toothing and the teeth, are achieved.

Typical embodiments comprise, between the profiling and the teeth, a bearing arrangement with pivot segments and rolling bodies. Typically, at least two mutually adjacently arranged teeth, which are in particular situated axially parallel or offset, are provided per pivot segment. In this way, the pivot segment can be stabilized in its raceway or on its respective running surface. Rotations of the pivot segment about a radial axis can be prevented. Typically, rolling bodies of embodiments are formed as cylindrical rollers or needle rollers.

Typical gear mechanisms of the invention are constructed such that a positive transmission ratio exists between a drive via the drive element and an output via the tooth carrier. A positive transmission ratio typically refers to a transmission ratio in the case of which the drive element and the tooth carrier rotate in the same direction.

In typical embodiments, the tooth carrier tooth pitch angle of the teeth or of the bearing arrangement of the teeth in the tooth carrier is smaller than the internal gear tooth pitch angle of the internal teeth of the toothing of the internal gear. The "tooth pitch" or the tooth pitch angle" are typically to be understood to mean imaginary variables; it is thus not necessary for teeth to actually be provided in the tooth carrier at every position predefined by the tooth pitch angle. The tooth pitch angle is calculated in each case as 360° divided by the number of theoretically possible positions for teeth in the tooth carrier, or by the number of teeth actually provided in the toothing, in the circumferential direction.

In typical embodiments, not every tooth pitch angular position is occupied by a tooth in the tooth carrier; rather, it is for example the case that only every second position or every third position or every fourth position is occupied by a tooth. In this way, abundant space is available for the teeth and for material of the tooth carrier, because, at positions at which no teeth are provided, material of the tooth carrier can be provided. For example, in the case of a position factor of 2, there is sufficient space between two teeth or tooth guides for webs of the tooth carrier between the teeth in order to sufficiently stiffen the tooth carrier. In typical embodiments, the number of tooth guides corresponds to the number of teeth accommodated in the tooth carrier. In typical embodiments, every second position that is predefined by the tooth pitch angle of the teeth is free. The density with which the positions in the tooth carrier are occupied is reflected by the position factor. For example, a position factor of two means that only every second position in the tooth carrier predefined by the tooth pitch angle is occupied by a tooth; a position factor of three accordingly refers to every third position. The actual angular spacing between the teeth that are mounted in the tooth carrier typically amounts to two times, three times or four times the tooth pitch angle of said teeth or of the tooth carrier. In further embodiments, it is also possible for a spacing of more than four times to be provided. The actual angular spacing between adjacent teeth is thus calculated as the tooth pitch angle multiplied by the position factor. Typical position factors are integers greater than or equal to 1, and further typical position factors are greater than or equal to 2.

The number of theoretically possible positions for teeth is typically greater, by at least or exactly the number of elevations, than the number of internal teeth of the toothing of the internal gear. If only every second position in the tooth carrier is occupied, then the number of teeth in the tooth carrier in the case of a profiling with two elevations corresponds to the number of internal teeth of the toothing plus the number of elevations, divided by the position factor, which in this case is two. Typically, in exemplary embodiments, the number of teeth is calculated in accordance with the following formula:

$$Z_z = \frac{Z_I + E}{PF}$$

$Z_z$=number of teeth in the tooth carrier
$Z_I$=number of internal teeth of the internal gear E=number of elevations of the profiling or of the cam disk of the drive element
PF=position factor For the calculation of the transmission ratio between a drive, which rotates the drive element, and an output, which is connected to the tooth carrier of an embodiment of a gear mechanism according to the invention, the following formula is obtained, in which the number of internal teeth of the internal gear must always be stated as a negative:

$$i = 1 - \frac{(-Z_I)}{PF * Z_Z + (-Z_I)}$$

Typically, embodiments comprise an integer number of teeth in the tooth carrier. In typical embodiments with two elevations of the profiling, with a number of teeth in the internal gear of 46, and with only every second position predefined by the tooth carrier tooth pitch angle being occupied, that is to say a position factor 2, the number of teeth in the tooth carrier amounts to 24. With the above formula for i, this yields a transmission ratio of i=+24 in the case of drive of the drive element and output at the tooth carrier:

$$i = 1 - \frac{-46}{2 * 24 + (-46)}$$

In a further embodiment, with two elevations, with a number of teeth in the internal gear of 46, and with a position factor of 3, the number of teeth in the tooth carrier amounts to 16. Another embodiment, in the case of a number of teeth in the internal gear of 45 and with only every second position predefined by the tooth carrier tooth pitch angle being occupied, that is to say a position factor of 2, has 24 teeth in the tooth carrier in the case of 3 elevations.

Typical gear mechanisms comprise rolling bodies, which are arranged on the profiling, and a multiplicity of pivot segments for the mounting of the teeth, wherein the pivot segments are arranged on the rolling bodies, wherein the rolling bodies are arranged in at least two rolling body rows, which are parallel in the direction of rotation of the cam disk, on the profiling. Typical embodiments comprise one or at least two rolling body rows, which are typically arranged axially adjacent to one another and/or so as to run parallel, per encircling row of pivot segments. A pivot segment may be mounted on at least two rolling body rows which run in encircling fashion in parallel. Here, in the case of two or more rows of teeth arranged parallel, in each case one rolling body row may be arranged under a tooth row, such that the pivot segment is supported under each tooth row. A typical arrangement is for example an arrangement of the row of teeth radially over the rolling body row with interposed pivot segment. The central axis of the respective teeth typically lies in the middle 80% or middle 50% or middle 20% or at least substantially in the center over the respective rolling bodies. In this way, the rolling bodies are loaded substantially centrally. In typical embodiments, one of the rolling body rows is arranged in an axial plane with one of the rows of teeth. Typically, in each case one row is in one axial plane, wherein the same axial plane means for example that the centers at least substantially coincide, and/or the teeth are arranged entirely within the axially extended region of the respective rolling body row.

Typically, the profiling has a running surface for the at least one row of rolling bearings. Typically, the profiling comprises at least two parallel running surfaces. In typical embodiments, in each case one of the rolling body rows is arranged in or on one of the parallel running surfaces. In this way, rolling bodies running parallel have dedicated running surfaces, or each rolling body row can be guided in a defined, dedicated running surface.

The profiling is typically divided by at least one encircling central rib. In this way, in embodiments, parallel running surfaces can be created, typically to both sides of the central rib. It is possible for multiple parallel central ribs to be provided in order to create more than two parallel running surfaces, in typical embodiments with two rows of teeth or more than two rows of teeth.

The cam disk typically comprises two encircling edge ribs. The edge ribs typically delimit in each case one outer running surface in the axially outward direction. Centrally, the running surfaces are typically delimited by a central rib. In typical embodiments, the edge ribs together with exactly one central rib delimit two running surfaces; in further embodiments, multiple central ribs and thus also more than two running surfaces, and possibly also more than two rolling body rows, are provided.

The central rib and/or the edge ribs may each have a height which at least substantially corresponds to the diameter of the rolling bodies. In further embodiments, they may have a height which is slightly smaller, for example smaller by between 0% and 10% or between 0% and 5%, than the diameter. In further embodiments, the height of the central rib and/or of the edge ribs is only between 50% and 80% or between 50% and 95% of the diameter of the rolling bodies. The central rib and edge ribs may have different heights; for example, the central rib may be shorter than the edge ribs. In embodiments, edge ribs are also used as stabilizing surfaces for the pivot segments. In further embodiments, the central rib is taller than the edge ribs, for example if the central rib is used for stabilizing the running smoothness of the pivot segments.

Typically, the pivot segments lie in each case with a rolling bearing surface on one side on at least a part of the rolling bodies, and have, on a side situated opposite the rolling bearing surface, in each case one tooth bearing surface, wherein typically, at least two teeth are articulately mounted on a tooth bearing surface. In typical embodiments, the tooth bearing surface is formed such that the tooth bearing surface forms a common axis of rotation for the at least two teeth. Typical tooth bearing surfaces of embodiments comprise in each case one rounded surface section for in each case at least one tooth and/or multiple teeth arranged axially parallel, wherein the central point of the radius of the rounded surface section at least substantially coincides with the rolling bearing surface. Typically, an axis of rotation of the tooth bearing formed by the tooth bearing surface at least substantially coincides with the rolling bearing surface. The tooth bearing surface may be formed, in the region of the tooth bearing, as a bead and/or as a circular segment.

Typical gear mechanisms of embodiments comprise rows of teeth running in encircling fashion in parallel. Typically, there are at least or exactly two rows of teeth. The teeth typically run in rows, which run in encircling fashion in parallel, on guides of the tooth carrier.

In typical embodiments, in each case at least two parallel teeth are arranged on a pivot segment. Typically, the two parallel teeth belong to the two parallel rows of teeth, which are guided for example in guides in the tooth carrier. In embodiments, two parallel teeth of parallel rows of teeth are arranged one behind the other in an axial direction on a pivot segment, typically on a bead or in a depression of the pivot segment.

Typical tooth carriers of embodiments comprise at least one radially inwardly or radially outwardly extending run-on flange, which engages over the pivot segments at least partially in an axial direction. In this way, there is the option to dispense with additional run-on disks. The run-on flange may be formed integrally with the tooth carrier or may be fastened to the tooth carrier. Typical embodiments have no run-on disk. Some embodiments comprise a run-on disk at least on one side axially adjacent to the pivot segments and/or adjacent to the rolling bodies for guiding the pivot segments.

In embodiments with a run-on flange on the tooth carrier, it is typically the case that at least one of the run-on flanges comprises a drive bearing surface which interacts directly with drive bearing rolling bodies. Typically, a bearing is formed integrally between tooth carrier and the cam disk or a shaft connected to the cam disk. Such embodiments can be of space-saving design. Typically, the drive bearing rolling bodies are mounted directly on the cam disk. In further embodiments, a bearing with bearing rings is provided between tooth carrier and cam disk. This can simplify production.

Typically, in each case one rim bearing surface is arranged on the pivot segments at both sides, and/or at the edge side of the pivot segment, in an axial direction. In further embodiments, rib bearing surfaces are arranged centrally in an axial direction on the pivot segments, which rib bearing surfaces are for example provided for bearing against a central rib. In embodiments with two rib bearing surfaces at both sides and/or at the edge side, the rib bearing surfaces may lie at least partially on the edge ribs of the cam disk. In this way, tilting of the pivot segments can be prevented, and smooth running can be ensured.

Advantages of typical embodiments are an increased load capacity, lengthened service life or a more compact design. In typical embodiments of gear mechanisms according to the invention, the circumferential forces on the cam disk or the drive element act in the same direction as the circumferential forces of the internal gear, which, by contrast to gear mechanisms known from the prior art, leads to a reduction of the reaction forces in the tooth guide. The forces for the guidance of the teeth in the tooth carrier are, in embodiments, reduced by approximately 10% at the outer tooth contact in the tooth carrier and approximately 50% at the inner tooth contact in the tooth carrier. The thus reduced friction forces also reduce the reaction forces in the bearing arrangement of the cam disk during traction operation, that is to say when drive is imparted via the cam disk. The reduction there amounts to approximately 12% during traction operation. Since this bearing arrangement is commonly the definitive element for the maximum torque or the service life of the gear mechanism, the torque or the service life of the gear mechanism can be increased. Furthermore, the efficiency can also be increased, by approximately 1%-3%.

BRIEF DESCRIPTION OF THE DRAWINGS

The invention will be discussed in more detail below on the basis of the appended drawings, wherein, in the figures.

DESCRIPTION OF EXEMPLARY EMBODIMENTS

Typical embodiments of the invention will be described below on the basis of the figures, wherein the invention is not restricted to the exemplary embodiments; rather, the scope of the invention is defined by the claims. In the description of the embodiment, in some cases in different figures and for different embodiments, the same reference designations are used for identical or similar parts, in order to make the description clearer. This however does not mean that corresponding parts of the invention are restricted to the variants illustrated in the embodiments.

Tooth carriers of generic gear mechanisms are presented for example in DE 10 2015 105524 A1. Such gear mechanisms have a tooth carrier tooth pitch angle of the teeth, which is typically greater than the internal gear tooth pitch angle of the internal teeth of the toothing of the internal gear. With such a construction, it is possible to realize large negative transmission ratios between drive element and tooth carrier. On the basis of such gear mechanisms, it will be described below how gear mechanisms of the invention are constructed with positive transmission ratios between drive element and tooth carrier.

Figure 1:
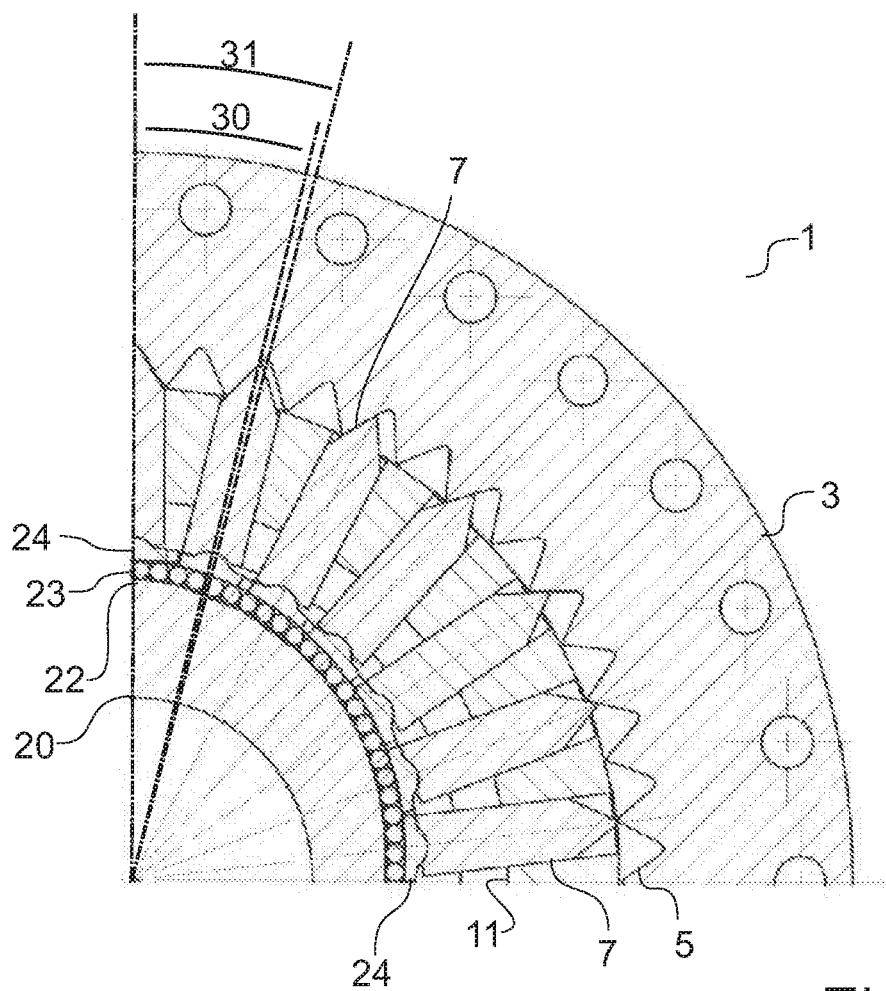
FIG. 1 schematically shows a first embodiment of the invention in a partial schematic sectional view.

FIG. 1 shows an exemplary embodiment in a partial, quartered, schematic sectional view. FIG. 1 schematically shows, in a quartered section, a gear mechanism 1 which has an internal gear 3 with an internally situated encircling toothing 5. The other three further quarters of the gear mechanism 1 are, in section, of analogously mirrored construction in relation to the illustrated section.

Teeth 7 engage into the toothing 5. For the sake of better clarity, not every tooth 7 of FIG. 1 is also denoted by the reference designation 7. Typically, two axially parallel rings of teeth with individual teeth 7 are provided. The teeth 7 are mounted radially displaceably in a tooth carrier 11. For this purpose, the tooth carrier 11 has radially oriented, channel-like, circular or slot-like openings, which ensure radial guidance of the teeth 7 in the tooth carrier 11. Owing to the radial guidance in the openings, it is possible for the teeth 7 to move only in a radial direction along their longitudinal axis; in particular, a rotation about a longitudinal axis of the gear mechanism 1 relative to the tooth carrier 11 is prevented.

The longitudinal axis of the teeth typically refers to the axis running from the tooth root to the tooth tip, whereas the longitudinal axis of the gear mechanism points in the direction of the axis of rotation of the gear mechanism. This may for example be the axis of rotation of the tooth carrier that can be used as output, or the axis of rotation of a cam disk.

The teeth 7 are driven by a drive element in the form of a cam disk 20, which is designed as a hollow cam disk 20. The cam disk 20 has a profiling 22 for driving the teeth 7 in a radial direction. The profiling 22 has a profile with two elevations over the circumference, such that in each case oppositely situated teeth 7 are engaged to the furthest extent into tooth spaces of the toothing 5 (not visible in the quarter section of FIG. 1).

In the gear mechanism 1 illustrated in FIG. 1, the teeth 7 are arranged with a rolling bearing arrangement on the profiling of the drive element. The rolling bearing arrangement comprises rolling bodies 23 which, in this exemplary embodiment, are designed as needle rollers.

In the exemplary embodiment of FIG. 1, the output is picked off at the tooth carrier, wherein the internal gear with the toothing is fixed.

The gear mechanism 1 comprises a segmented bearing arrangement for the teeth 7. The segmented bearing arrangement comprises pivot segments 24 which, in each case on the side facing toward the tooth 7, have a rounded, in particular sectionally cylindrical tooth bearing surface (see FIG. 2), which forms a bead on which the root of a tooth 7, or in typical embodiments two, three or four teeth adjacent to one another in an axial direction of the gear mechanism 1, may be arranged. The bead together with a corresponding recess in the tooth root of the respective tooth 7 prevents slippage of the tooth 7 on the pivot segment 24.

With the beads, respective root joints for the teeth 7 are formed, such that the teeth 7 can tilt relative to the pivot segments 24 in order to ensure unconstrained guidance. The pivot segments 24 are displaceable relative to one another in a circumferential direction, such that the spacings between the pivot segments 24 can be varied. In this way, the degree of freedom in the circumferential direction of the pivot segments 24 is also not blocked. This permits substantially unconstrained guidance and substantially unconstrained radial drive of the pivot segments 24 by the profiling 22 of the cam disk 20. For a minimization of the friction resistance between the profiling 22 and the pivot segments 24, the rolling bodies 23 are provided as needle rollers. In further embodiments, cylindrical rollers or other rolling bearings are provided for the mounting of pivot segments.

As can be seen in FIG. 1, the tooth carrier tooth pitch angle of the teeth 7 in the tooth carrier 11 is smaller than the internal gear tooth pitch angle of the internal teeth of the toothing 5 of the internal gear. This is illustrated in FIG. 1 by a doubled tooth carrier tooth pitch angle 30 and a doubled internal gear tooth pitch angle 31. Here, it must be taken into consideration that only every second position predefined by the tooth carrier tooth pitch angle is occupied by a tooth 7 in the tooth carrier 11.

Altogether, the gear mechanism, of which only a quarter is illustrated in section in FIG. 1, has 26 teeth and 50 internal teeth and two elevations of the profiling. Thus, in this exemplary embodiment, the number of teeth is greater, by one, than half of the number of internal teeth. The position factor in the exemplary embodiment amounts to two, that is to say only every second position in the tooth carrier predefined by the theoretical tooth carrier tooth pitch angle is occupied by a tooth. This yields a positive transmission ratio of i=+26.

Figure 2:
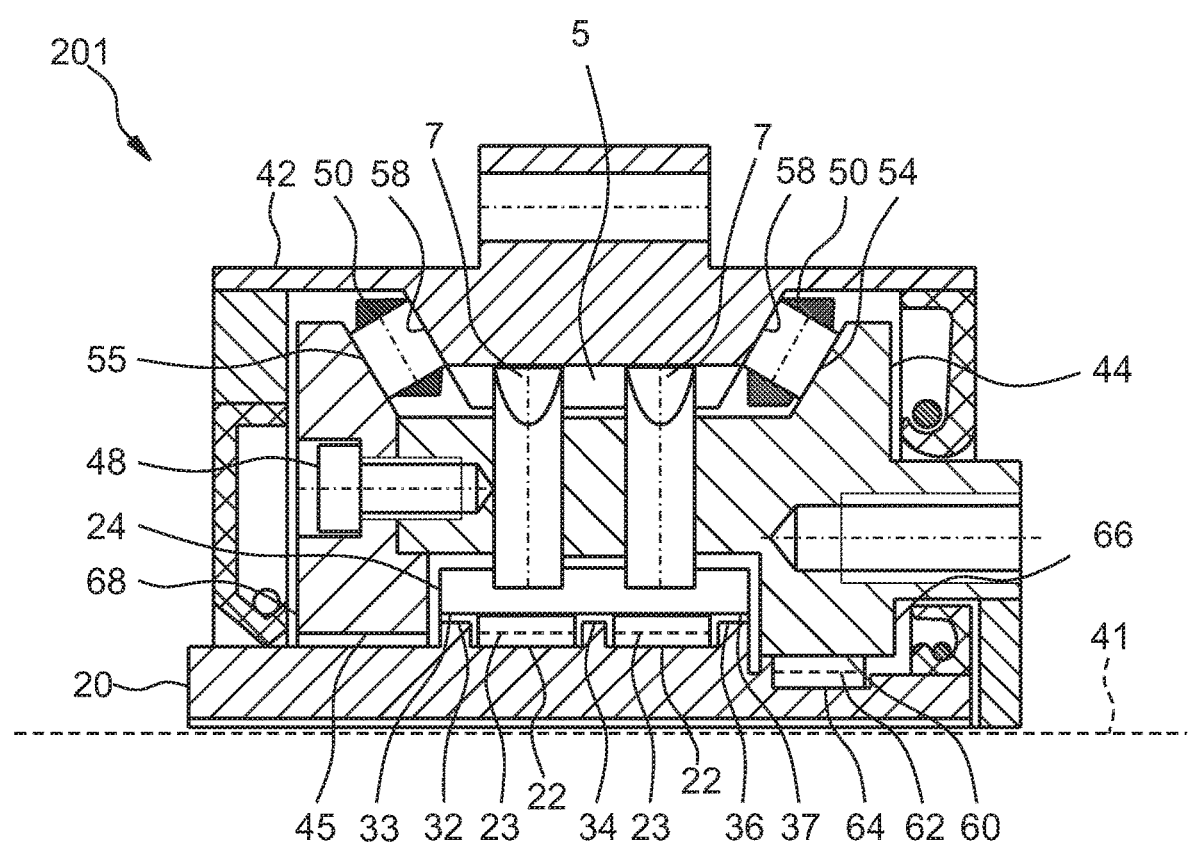
FIG. 2 schematically shows a further embodiment in a half-section.

FIG. 2 shows a further embodiment in a half-section. The features of the embodiment of FIG. 2 may be combined with the features of the embodiment of FIG. 1; in particular, the gear mechanism of FIG. 2 likewise has a positive transmission ratio, because the arrangement and number of the teeth in a section perpendicular to the longitudinal axis corresponds to the embodiment of FIG. 1. Particular advantages from the combination result from the fact that the features illustrated in FIG. 1 and FIG. 2 yield a particularly compact structural form with a high load capacity. The same reference designations are used for identical or similar parts.

The gear mechanism 201 of FIG. 2 comprises a cam disk 20 as drive element, which is formed integrally with a drive shaft and thereby has an elongate form in an axial direction. The cam disk 20 comprises two profilings 22, which may also be referred to as raceways or pivot bearing raceways. Said profilings 22 have a radius which varies over the circumference; in particular, they have in each case two maxima, which may also be referred to as elevations, and two minima, wherein the two profilings 22 have the same angular position of the varying radii.

Further embodiments have only one raceway or one profiling. In alternative embodiments, it is also possible for three or more profilings or raceways for rolling bodies to be provided.

Rolling bodies 23 are mounted on the profilings 22. On said rolling bodies 23 there are mounted pivot segments 24, wherein only one pivot segment 24 is illustrated in the sectional view of FIG. 1. The pivot segment 24 thus lies on two rows of encircling rolling bodies 23.

The pivot segment 24 comprises a bead on the radially outer side of the pivot segment 24, which bead engages into grooves of two teeth 7. The teeth 7 are, in terms of their axial position with respect to the longitudinal axis 41 of the gear mechanism 1, mounted at least substantially centrally by means of the rolling bodies 23, wherein in each case one tooth 7 is mounted by means of one of the two rolling bodies 23. In this way, a continuous transmission of force by means of the pivot segment 24 is realized. Furthermore, the rolling bodies 23 designed as needle rollers are loaded approximately centrally. Furthermore, the structural length of the rolling bodies 23 themselves can be reduced by means of this measure, wherein the running stability can be increased.

To delimit the profilings 22, the cam disk 20 has ribs 32, 34 and 36. The rib 34 is situated centrally between the rolling bodies 23, whereas the two ribs 32 and 36 restrict the freedom of movement of the rolling bodies 23 in each case in an outward axial direction. The pivot segment 24 has rib bearing surfaces 33 and 37, which can be supported in each case on the ribs 32 and 36. In further embodiments, the pivot segment is supported on the central rib. In this way, the running smoothness of the pivot segment 24 is increased.

The teeth 7 engage into a common toothing 5, which is formed integrally with a housing 42 of the gear mechanism 1. In this way, the internal gear with the toothing is formed integrally in the housing, such that individual parts can be dispensed with for the benefit of a compact design and simple production. In further embodiments, the internal gear and housing are formed separately.

The teeth 7 are received in radially oriented guides in a second tooth carrier part 44 of a tooth carrier. The tooth carrier furthermore also comprises a first tooth carrier part 45, which is connected to the second tooth carrier part 44 by a connecting means 48 in the form of a screw. A multiplicity of connecting means 48 is provided over the circumference of the tooth carrier, with a total of six being provided in the exemplary embodiment of FIG. 1.

In further embodiments, it is also possible for a different number of connecting means to be provided, wherein an odd number is also possible. The connecting means may be distributed uniformly over the circumference of the tooth carrier, though it is also possible to provide different angular spacings, for example in order to allow the two tooth carrier parts to be joined together only in one particular angular position. In the embodiment of FIG. 1, by way of example, the angles between the connecting means are thus not uniform, in order that the tooth carrier parts of the tooth carrier can be reassembled only in one particular relative angular position with respect to one another. In further embodiments, it is possible for grooves, pins or other contours to be provided, or markings may be provided in order to allow or permit reassembly only in one particular angular position. In this way, machining of the tooth carrier is possible in one chuck setup, wherein the tooth carrier parts are subsequently released from one another again in order for them to then be connected to one another again in the gear mechanism.

For the mounting of the tooth carrier on the housing 42, rolling bodies 50 are provided which are mounted at an angle of 60° with respect to the longitudinal axis 41 of the gear mechanism 1. Here, the angular positions of the rolling bodies 50 are mirror-symmetrical with respect to an axial section plane of the gear mechanism 1, in order to realize reliable mounting of the tooth carrier in the housing 42. In further embodiments, angles greater or smaller than 60° are also used depending on whether axial forces, and what magnitude of axial forces, are to be accommodated.

The rolling bodies 50 are mounted in each case directly on tooth carrier bearing surfaces 54 and 55 of the first tooth carrier part 44 and of the second tooth carrier part 45. At the housing side, the rolling bodies 50 are mounted on housing bearing surfaces 58 of the housing 42. The rolling bodies 50 thus roll in each case directly on the tooth carrier bearing surfaces 54 and 55 and on the housing bearing surfaces 58. In this way, a compact integral bearing arrangement is realized which takes up little structural space.

Furthermore, in the exemplary embodiment of FIG. 1, the drive bearing is also formed as an integral bearing, wherein the tooth carrier, or in the embodiment of FIG. 1, the second tooth carrier part 44, has a drive bearing surface 60, on which drive bearing rolling bodies 62, which are formed as rollers, directly roll. On the cam disk there is formed a further drive bearing surface 64, which likewise interacts directly with the drive bearing rolling bodies 62. In this way, the drive bearing rolling bodies roll directly on the cam disk 20. In this way, an integrated bearing is created for a compact structural form.

The drive bearing surface 60 of the second tooth carrier part 44 is part of an output-side run-on flange 66, which prevents a deflection of the pivot segments 24 in the output-side direction. By means of the integral design of the run-on flange 66 with the second tooth carrier part 44, a compact structural form and high stiffness are achieved.

The first tooth carrier part 45 has a further run-on flange 68, which likewise prevents a deflection of the pivot segments 24 in the opposite direction.

Typically, opposite the output, that is to say opposite the side of the drive bearing, a further bearing is provided for the cam disk 20 formed integrally with a drive shaft. Said further bearing however lies outside the region illustrated in FIG. 1. At the drive side, there is under some circumstances also a relatively large structural space available in a radial direction, such that the drive-side bearing can possibly be designed as a bearing with separate running surfaces. In further embodiments, the drive bearing may also be formed as an integral bearing.

The invention claimed is:
1. Coaxial gear mechanism (1, 201), comprising
an internal gear (3) with an inwardly directed toothing (5),
a tooth carrier (11) which is arranged coaxially with respect to the internal gear and in which a multiplicity of teeth (7) for engaging with the toothing (5) are accommodated, wherein the teeth (7) are mounted radially displaceably in the tooth carrier (11),
a drive element (20) with a profiling (22) for radially driving the radially displaceably mounted teeth (7), wherein the profiling (22) has, over its circumference, at least two elevations,
wherein the gear mechanism is constructed such that there is a positive transmission ratio between a drive via the drive element (20) and an output via the tooth carrier (11),
rolling bodies (23) which are arranged on the profiling (22), and
a multiplicity of pivot segments (24) for the mounting of the teeth (7), wherein the pivot segments (24) are arranged on the rolling bodies (23),
wherein the tooth carrier tooth pitch angle of the teeth (7) is smaller than the internal gear tooth pitch angle of the internal teeth of the toothing (5) of the internal gear (3), and
wherein the number of teeth (7) is calculated in accordance with the following formula:

$$Z_z = \frac{Z_I + E}{PF},$$

wherein Zz is the number of teeth (7) in the tooth carrier (11), wherein ZI is the number of internal teeth of the internal gear (3), and wherein E is a number of elevations of the profiling (22) of the drive element, and wherein PF is a position factor which is an integer, and wherein E is at least two.

2. Gear mechanism (1) according to claim 1, wherein, in the tooth carrier (11), only every at least second position predefined by the tooth carrier tooth pitch angle is occupied by a tooth (7).

3. Gear mechanism (1) according to claim 1, wherein the number of teeth (7) is greater, by at least or exactly one, than half of the number of internal teeth of the toothing (5) of the internal gear (3).

4. Gear mechanism (1) according to claim 1, wherein the rolling bodies (23) are arranged in at least two rolling body rows, which are parallel in the direction of rotation of the cam disk, on the profiling (22).

5. Gear mechanism (1) according to claim 1, wherein the profiling (22) has at least two parallel running surfaces which are divided by an at least partially encircling central rib (34).

6. Gear mechanism (1) according to claim 1, wherein each of the teeth (7) is formed as a single piece.

7. Gear mechanism (1) according to claim 1, wherein the forces for the guidance of the teeth (7) in the tooth carrier (11) are reduced by at least 10% as compared to a gearing having a negative transmission ratio.

8. Gear mechanism (1) according to claim 1, wherein the internal teeth of the toothing (5) and the teeth (7) each have tooth tips which, in cross section, correspond to a truncated pyramid or a pyramid in each case with curved flanks.

9. Gear mechanism (1) according to claim 1, wherein the internal teeth of the toothing (5) and the teeth (7) each have a radius on the tip of the tooth.

10. Method for producing a gear mechanism (1) according to claim 1.

* * * * *